Aug. 18, 1953 A. D. ODELL 2,649,502

ELECTRICAL CIRCUITS EMPLOYING GASEOUS DISCHARGE TUBES

Filed March 3, 1950 4 Sheets-Sheet 1

Inventor
ALEXANDER D. ODELL

By Robert Harding Jr.
Attorney

Aug. 18, 1953 A. D. ODELL 2,649,502

ELECTRICAL CIRCUITS EMPLOYING GASEOUS DISCHARGE TUBES

Filed March 3, 1950 4 Sheets-Sheet 2

Inventor
ALEXANDER D. ODELL

By Robert Harding Jr.
Attorney

ELECTRICAL CIRCUITS EMPLOYING GASEOUS DISCHARGE TUBES

Filed March 3, 1950 4 Sheets-Sheet 3

Inventor
ALEXANDER D. ODELL

By Robert Harding Jr.
Attorney

ELECTRICAL CIRCUITS EMPLOYING GASEOUS DISCHARGE TUBES

Filed March 3, 1950 4 Sheets-Sheet 4

Inventor
ALEXANDER D. ODELL

By Robert Harding Jr.
Attorney

Patented Aug. 18, 1953 2,649,502

UNITED STATES PATENT OFFICE 2,649,502

ELECTRICAL CIRCUITS EMPLOYING GASEOUS DISCHARGE TUBES

Alexander Douglas Odell, London, England, assignor to International Standard Electric Corporation, New York, N. Y., a corporation of Delaware Application March 3, 1950, Serial No. 147,378
In Great Britain March 4, 1949

9 Claims. (Cl. 178—17)

This invention relates to electric circuits for the storage and transmission of information and to communication apparatus employing such circuits.

The object of the invention is to provide more simple circuits of this kind than have hitherto been available.

The main feature of the invention is an electric circuit for storage and transmission of information comprising a group of interconnected static electrical switches, means for storing information on said switches in the form of a pattern of operated and non-operated switches and means for transmitting the said stored information under control of said switch group as an impulse train wherein the spacing between impulses varies and is dependent upon the said pattern of operated and non-operated switches.

Another feature of the invention is teleprinter code storage and sender equipment comprising a group of interconnected static electrical switches, means for storing a code combination on said switches in the form of a pattern of operated and non-operated switches, and means for transmitting the said combination under control of the said switch group, the kind of each element thereof being dependent upon the said pattern of operated and non-operated switches.

A third feature of the invention provides impulse storage and regenerator equipment comprising a group of interconnected static electrical switches, means for storing an impulse train divided into a plurality of variable-valued digits in the form of a pattern of operated and non-operated switches, and means for transmitting the said stored impulse train, under control of the said switch group, the number of impulses in each transmitted digit being dependent upon the said pattern of operated and non-operated switches.

The term "static" electrical switch as used above and throughout the specification and claims is defined as a static electrical device the conductance of a path through which is capable of a particular change from one stationary value to another separated stationary value, this change being caused by an excitation of electrical charges and resulting in the movement of electrical charges only.

A switch in which the conductance has undergone the change to said separated stationary value will be termed an "operated" switch whilst one whose conductance has not undergone that change will be termed a "non-operated" switch.

This definition embraces, but is not in any way limited to the following devices which are cited as examples: gaseous discharge tube trigger circuits both of the hot cathode and the cold cathode glow varieties, thermistor, hard-tube trigger circuits and transistors.

The invention will be particularly described with reference to two embodiments thereof. Both of these embodiments employ static electrical switches of the cold cathode glow discharge tube kind, but it will be clear to those skilled in the art, that other forms of such switches might equally well be employed. For instance, the circuits described and shown in the accompanying drawings would need little change for hot cathode gaseous discharge tubes to be employable instead of the cold cathode glow discharge tubes.

In the accompanying drawings—

Figure 1:
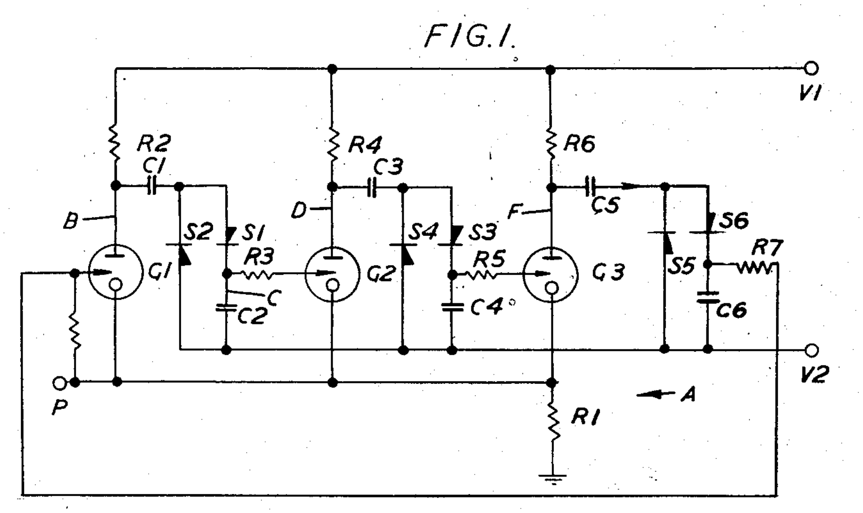
Fig. 1 is a schematic diagram of a circuit which will be used in explaining the fundamental method of operation employed in both embodiments of the invention whilst

In well-known electric counting chain circuits employing gaseous discharge tubes, a common principle of operation is that (i) before any tube in the chain can be triggered by an operating electrical pulse into its discharging or operated condition, the tube immediately prior to it in the chain must itself, have been operated, and (ii) a charge of potential produced by the striking of a tube is operable to extinguish the discharge in the immediately previous tube.

This principle is generally adopted but the circuits according to the two embodiments of the invention utilise the principles that:

(1) The leading edge of the operating pulse is made to extinguish any tube which may be ionised, and the trailing edge of the pulse is made to trigger the next tube in the chain.

(2) In a normal counting process a tube may be triggered only if that gap immediately prior to it has just been extinguished.

In the drawing, relays have been designated by a capital letter or letters over a straight line under which is a number, the number representing the number of contacts which are physically controlled by the relay. These contacts are shown distributed over the various figures in the circuits which they control, rather than in close association with the relays to which they belong. The contacts are designated by the lower case letter or letters of the relay to which they belong followed by a number to differentiate the contacts of the same relay. This arrangement avoids a complex wiring diagram and makes the drawing easier to read and understand.

Referring now to Fig. 1 for the purpose of explanation the following relationships will be assumed;

$V_1$=a voltage between main gap (i. e. anode/cathode) breakdown potential and main gap sustaining potential.
$V_2$=⅔ trigger cathode breakdown potential.
$V_3$=main gap sustaining potential.
$R_1$ is small compared with $R_2$, $R_4$, $R_6$.

Figure 2:
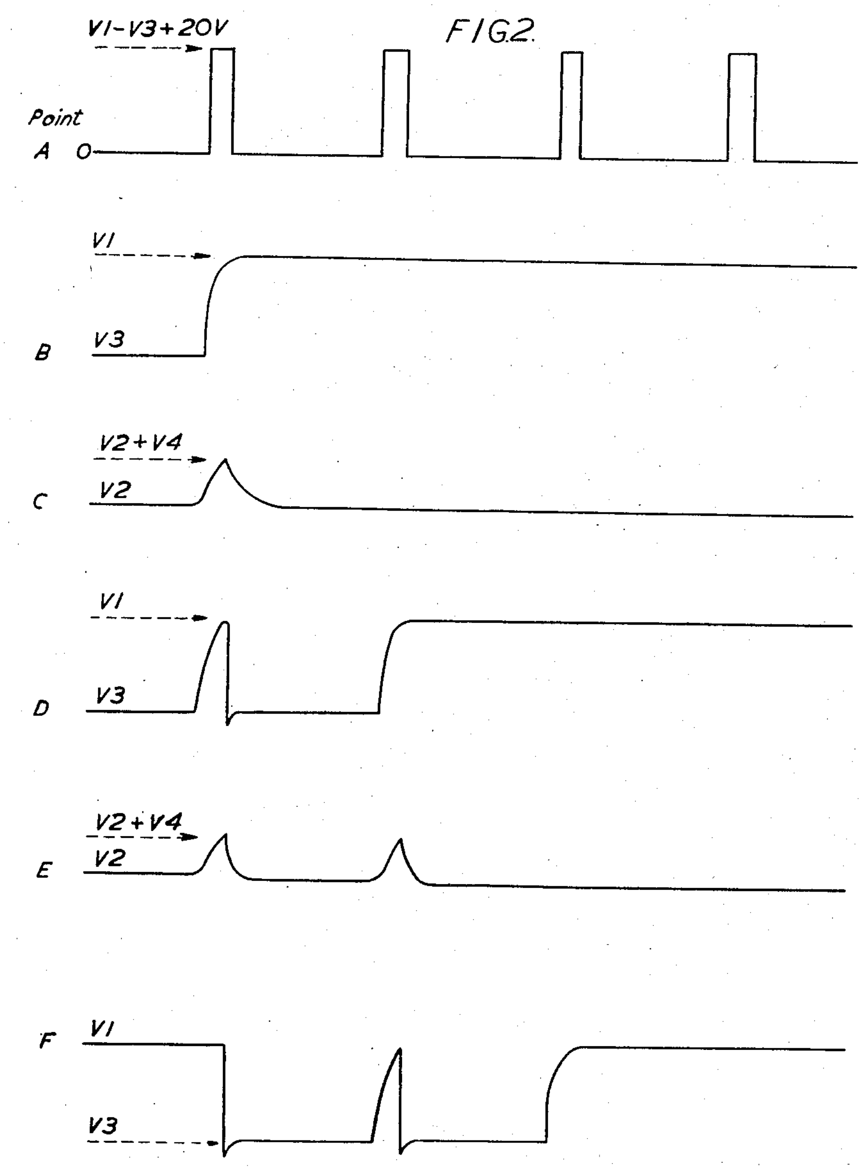
Fig. 2 shows voltage waveforms at different points of the circuit of Fig. 1.

Consider first the condition in which tubes $G_1$ and $G_2$ are conducting stably and $G_3$ is not conducting. Points B and D will then be at a potential of approximately $V_3$ volts. Point F, will be at $V_1$ volts. Assume now a positive pulse applied across $R_1$ from the supply point P whose amplitude is in excess of $(V_1-V_3)$ volts—(say $V_1-V_3+20$ volts)—and having a width greater than the de-ionisation time of the gas tubes under the conditions specified. The changes of voltage at appropriate points in the circuits are shown in Fig. 2. The potentials of the cathodes of all tubes will move positively, including the cathode potentials of $G_1$ and $G_2$ which will move up to $V_1$, causing these two tubes to extinguish. $G_3$ anode potential was already at $V_1$ since there was no voltage drop across $R_6$ and so no change is produced. As $G_1$ anode potential again moves towards $V_1$ volts, condensers $C_1$ and $C_2$ will charge up serially through rectifier $S_1$ and the low impedance source of $V_2$, with a time constant approximately given by $$t=R_2\frac{C_1C_2}{C_1+C_2}\text{ secs.}$$

This time-constant is made short enough to permit the potential across $C_2$ to rise very nearly to its maximum value before the end of the operating pulse.

The potential across $C_2$, say $V_4$, will then be determined by the approximate relationship:

$$V_4=\frac{(V_1-V_3)}{C_1+C_2}C_1\text{ volts}$$

with $C_1=2C_2$, this becomes:

$$V_4=\frac{2(V_1-V_3)}{3}\text{ volts}$$

and the trigger electrode of $G_2$ is raised to a potential of $$V_2+\frac{2(V_1-V_3)}{3}\text{ volts}$$

Similarly, the trigger electrode of $G_3$ is also raised to this potential. The trigger/cathode gaps of these tubes will not break down however, as long as the pulse is maintaining the cathodes positive. At the end of the pulse, all cathode potentials fall almost to zero, and as their trigger-cathode breakdown potentials are less than $(V_2+V_4)$ volts, tubes $G_2$ and $G_3$ will trigger. The potential of $G_2$ anode then drops to $V_3$ volts, and the potential across $S_4$ drops to zero.

Rapid discharge of condenser $C_4$ is prevented by the high backward resistance of $S_3$, whilst $C_3$ discharges through $S_4$. The trigger potential of $G_3$ is therefore maintained until triggering occurs, when $C_4$ discharges through $R_5$.

The next operating pulse finds $G_1$ anode at $V_1$ and $G_2$ and $G_3$ anodes at $V_3$. $G_2$ trigger will therefore not change its potential but as the trigger cathode is not to fire in the reverse direction it is necessary for the reverse trigger breakdown potential to be greater than the difference between the operating pulse amplitude and the bias voltage $V_2$, which is in the case under consideration, $$(V_1-V_3+20)-V_2=(V_1+20)-(V_3+V_2)\text{ volts}$$

Continuing, $G_3$ has its trigger potential raised by the charging of $C_4$, and at the end of this second operating pulse $G_3$ fires while $G_2$ remains extinguished.

Figure 3:
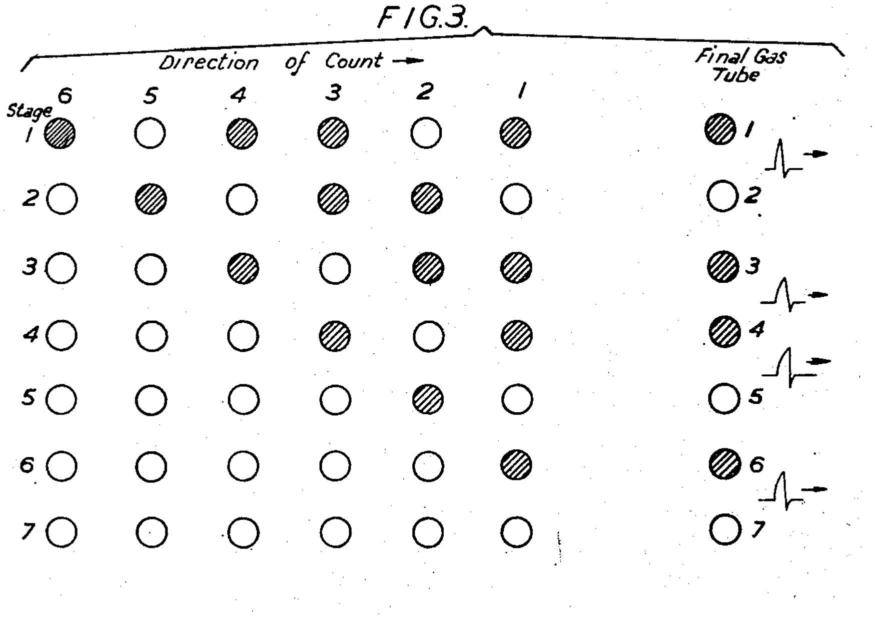
Fig. 3 is a diagram which will be used in explanation of the operation of the equipment of Fig. 4 and of circuits such as that of Fig. 1.

Fig. 3 shows diagrammatically the progress of counting out a particular pattern set up on a chain of six gas discharge tubes connected and operated as described.

The shaded circles represent tubes in a discharging or operated condition whilst the open circles are tubes which are not fired. As has been described above, each tube in the train which, on receipt of an operating impulse is already operated, is extinguished, and each extinction causes the tube to which the previously discharging tube has an anode/trigger connection (such as $C_1$, $S_1$, $R_3$) itself to be operated. Hence, if the direction of count is that indicated in Fig. 3 and if the first, third, fourth and sixth tubes reading from the right of the chain have been initially operated by some external means, then the receipt of each operating impulse on the common cathode lead effects the results indicated in the drawing as stages 2–7. The originally impressed pattern moves step by step in the direction of the count. The condition of the final tube is also separately shown in Fig. 3 and if we consider an output taken from the anode of that tube then it will be clear that on each extinction of its discharge an output impulse is transmitted. In Fig. 3 it is clearly shown that the receipt of the first, third, fourth and sixth operating impulses results in impulses being transmitted from the anode of the last tube. Hence a pattern of a particular kind has been impressed on a tube chain, there stored until it is required to be transmitted when an impulse output corresponding to the pattern is obtained. Alternatively, if the final tube is coupled to the first tube by a network. ($C_5$, $C_6$, $S_5$, $S_6$, $R_7$) similar to those previously described, so as to form a closed ring, then any desired pattern may be set up and displayed as a repetitive sequence at the anode of any tube in the chain.

Figure 4:
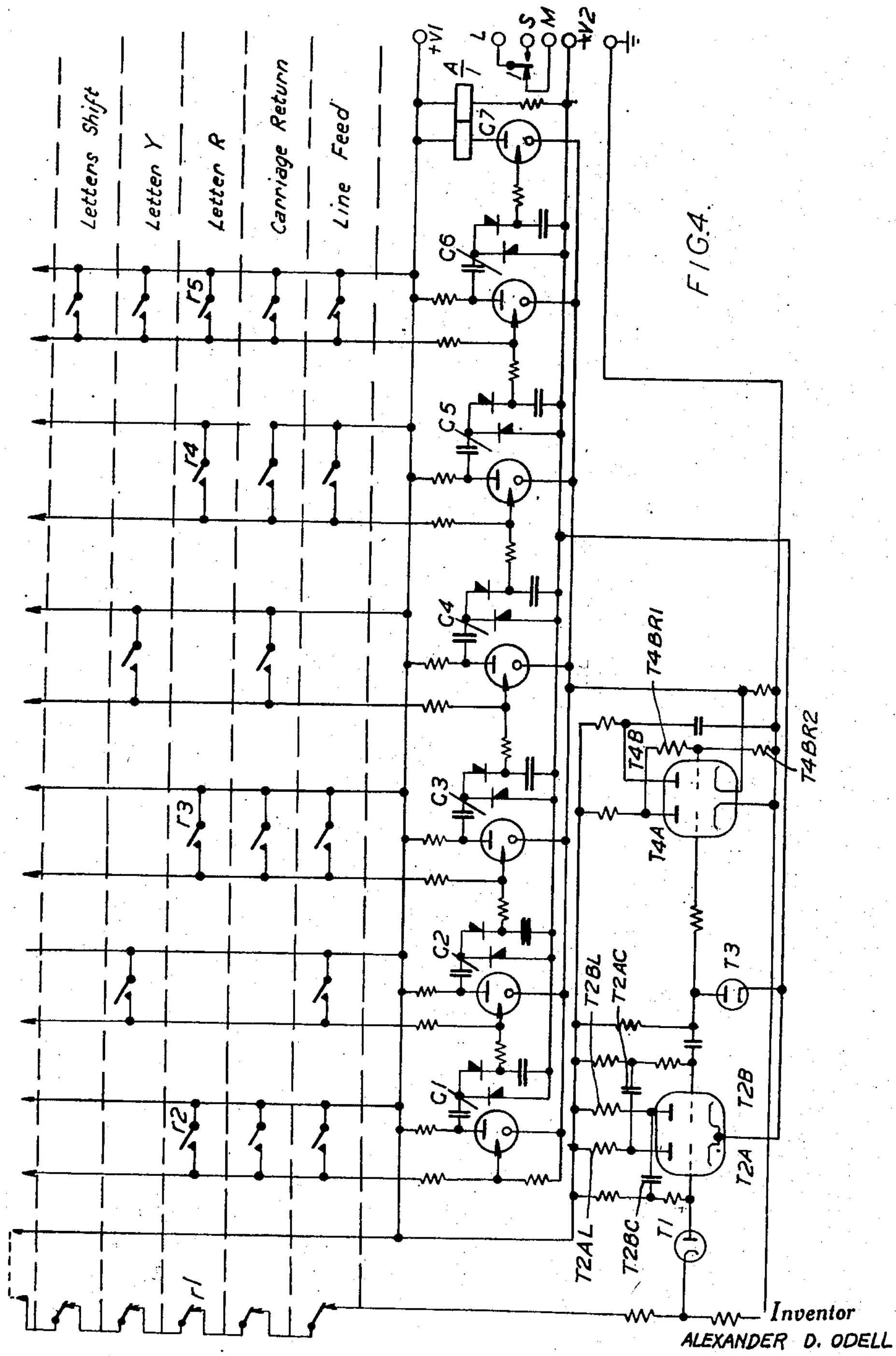
Fig. 4 shows the circuit arrangement of the first embodiment of the invention, namely teleprinter code storage and sending equipment.

Figure 4 illustrates an application of the invention to a first embodiment, namely a teleprinter code storage and sending equipment. GI to G7 are a group of interconnected static electrical switches of the gas discharge tube kind, operable in the manner described. A pattern corresponding to the teleprinter code it is desired to transmit is set up by operation of a selection of tubes GI to G6 by key contacts and is stored by the operation or non-operation thereof. An operated tube indicates that the transmitted code element resulting therefrom will be of one kind, in this case a "space" whilst an unoperated tube will cause the transmission of the other kind of element, a "mark."

The operation of any key, character or function will operate certain gas tubes. The particular tubes operated are determined by the mark-space sequence which it is desired to transmit and correspond to a particular character or function code. Referring to Fig. 4, the character key for the letter "R" has five contacts, numbers *r1* . . . *r5*, *r1* of which is included in a chain circuit providing the cathode potential for tube T1 whilst *r2* to *r5* are operable to affect tubes G1, G3, G5 and G6. The contacts of the other keys are shown also by way of example.

The operation of any key removes the positive potential from the cathode of T1, which assumes a potential near earth. The anode of T1 and hence the grid of T2A must also assume this potential, and since the cathodes of T2A and T2B are at a positive potential with respect to earth (+V2), T2A will be cut off and anode current will cease to flow. In this state the circuit is quiescent, and no operating pulses are applied to the counting chain. On releasing the key corresponding to the character required to be transmitted, a high positive potential (+V1) is re-applied to the cathode of T1 which ceases to conduct and permits the grid of T2A to move positively until anode current commences to flow. This causes a voltage drop across the anode load T2AL of T2A which is fed by the coupling capacity T2AC to the grid of T2B. T2B has an anode load resistor T2BL and a coupling condenser T2BC connected to the grid of T2A. The tubes T2A and T2B are thus connected in a multivibrator relationship. Normal multivibrator action now commences, the period being adjusted so that each half of the tube T2 is conducting for 25 milliseconds. Thus once every 50 milliseconds the grid of T2B is driven negative very rapidly, the first occasion being coincident with the releasing of the key as previously indicated. These negative-going waveforms are differentiated with a time-constant predetermined from consideration of the de-ionisation characteristics of the tubes G1 to G7. Their level is set by means of the limiting diode T3 so that the grid of T4A will receive biassing pulses of predetermined value. At T4A anode substantially square positive-going pulses are produced. Such a pulse is reduced to the required amplitude via a voltage divider consisting of resistors T4BR1 and T4BR2 and applied to the grid of T4B which functions as a cathode follower. Pulses from the cathode of T4B are applied to the cathodes of the gas tubes G1 to G7 comprising the storage and counting chain. The pattern set up on these tubes by operation of a particular key, say R (hence the pattern is caused by the operation of tubes G1, G3, G5, and G6 over *r2*, *r3*, *r4*, and *r5*, respectively) will be moved along. The end gas tube, G7, will be operated for space elements of the code and non-operated for mark elements.

As in standard teleprinter practice, the sender transmits a continuous mark signal when no information is being passed. This is obtained from mark potential supply M and passes to line L over back contact *a1*. During counting out of the pattern and consequent transmission of a code signal, the operation of relay A in the anode circuit of G7 follows the operation of tube G7 but does not follow the counting pulses. Each operation of G7, and therefore of relay A changes over contact *a1* and a space element of the code signal is transmitted to line. Relay A is normally biased to unoperated position by means of the right-hand winding thereof which is serially connected between voltages V1 and V2.

Recapitulating the storage and transmission procedure for the character "R," we see that on operation of the "R" key, contacts *r2* to *r5* effect the operation of tubes G1, G3, G5 and G6, G2 and G4 remaining unoperated. During the time of operation of the key *r1*, the circuit to T1 is opened, T2A cuts off and no operating impulses are allowed to proceed to the common cathode connection of tubes G1 to G7. When the key is released, operating pulses to the cathodes of the tubes in the chain are resumed and the pattern of operated and non-operated tubes steps one tube to the right (as shown) for each operating impulse received from the T1 to T4 circuit. The operation of G7 and of its anode relay A result in the appropriate code being sent to line, the space starting element resulting from the operation of G6 over *r5*. It will be observed from Fig. 4 that all character and function keys cause the operation of tube G6.

Figure 5:
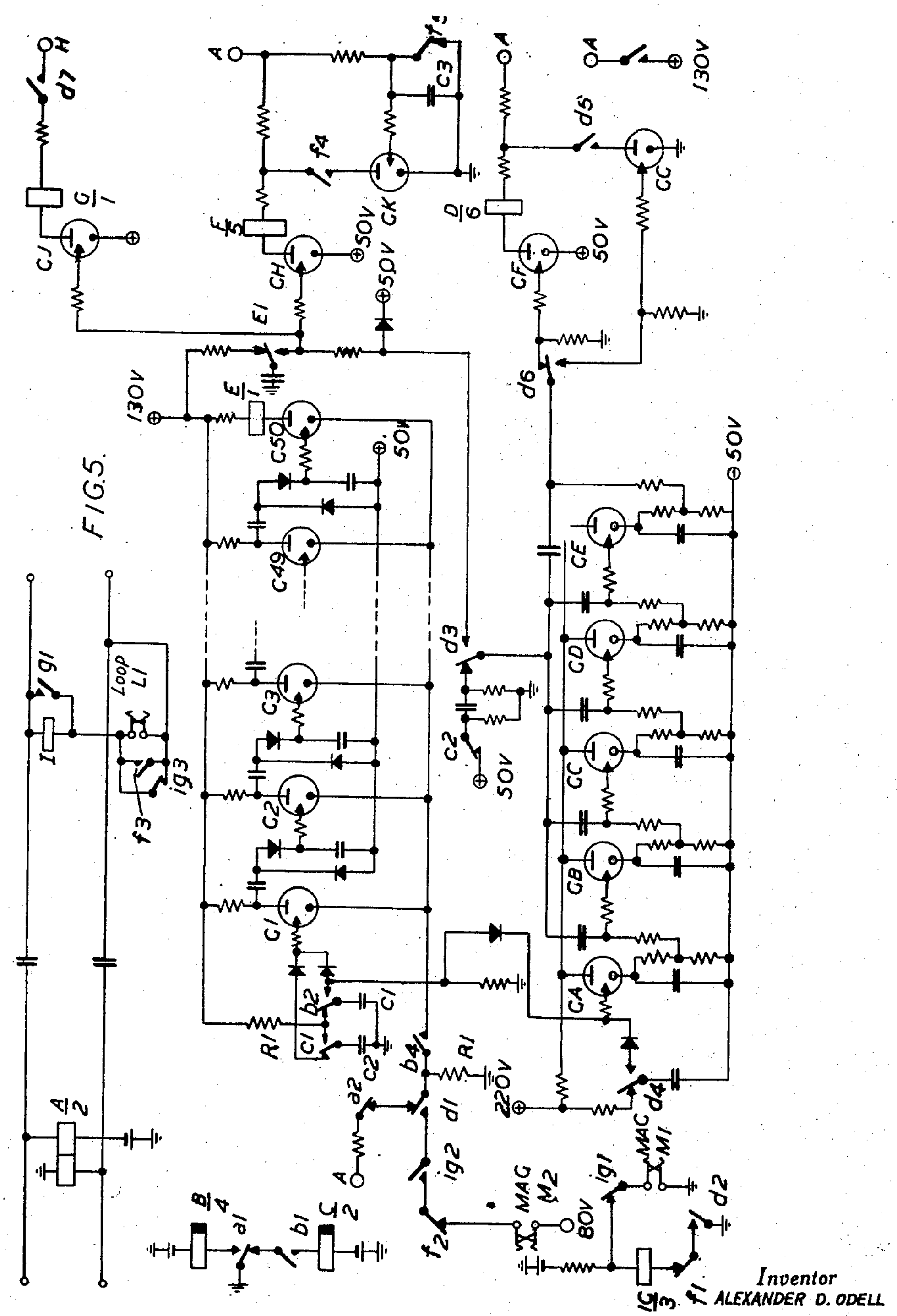
Fig. 5 shows the circuit arrangement of the second embodiment of the invention, namely a simple tube register for use in an automatic telephone exchange and capable of the storage and re-transmission of a five-digit number.

In a second embodiment of the invention its application to an impulse storage and regeneration circuit will be described. Such a circuit is obviously appropriate to an automatic telephone exchange with its dialled impulse trains and will be described in such relation, the circuit being shown in Fig. 5.

On lifting his receiver the subscriber completes the circuit for relay A to operate via the line loop completed between L1 and L2. This operates relay B over *a1* front which prepares C over *b1* front. Relay B is slow releasing and is maintained operated until A is finally released, i. e. when the subscriber re-opens his loop. Contact *b2* front triggers gas tube G1 and GA by discharging C1 which had been previously charged from 130 v. positive over R1, *b2* back to earth. Contact *b3* front applies a positive potential to all points marked "A" and *b4* front connects the cathodes of gas tubes GT1 to GT50 to resistance over R1 to earth. For each digit received relay A follows the separate impulses and over *a2* applies voltage pulses across R1 to the cathodes of tubes GT1 to GT50, which will result in the movement of any pattern along as has been previously described. Relay C is slow releasing and operates to the first and releases after the last impulse of each digit train. On releasing contact *c1* back causes re-operation of GT1 by discharging condenser C2 and contact *c2* back completes the circuit for 50 v. positive to be applied over *d3* back to the digit counting chain tubes GA to GE, whereby the discharge of GA is extinguished and GB is fired. This process is repeated for the other digits of the dialled number. On *c2* falling back after the fifth digit is completely received, the gas tube GF is triggered, operating relay D in its anode circuit. Over *d1* front, the control of the storage counting chain GT1 to GT50 is transferred from *a2* to magnet springs M2, operating at controlled speed and make and break ratio. From earth over *d2* front and *f1* back relay IG is prepared for operation at the next "break" of the magnet springs M1 when its short circuit via ground, M1 springs *ig1* back is removed, *d3* is removed, *d3* front transfers control of the digit counting chain from relay C to relay E, over contact *e1*, and *d4* triggers tube GA, resetting this counter. Contacts *d5* front and *d6* front make such changes as are necessary to release relay D under conditions to be described later, whilst *d7* front applies anode potential to gas tube GJ.

On the first "break" of the magnet springs M1 following the operation of relay D, relay IG will operate. Contact ig1 removes the previous short circuit path of this relay by contacts M1, ig2 front connects resistance R1 to the magnet springs M2 over d1 front and f2 back, and ig3 front removes the short circuit from loop springs L1 connected across the outgoing line.

The storage counting chain then counts along in the manner previously described under control of M2 until tube GT50 strikes. The operation of GT50 also operates relay E in its anode circuit. This relay over e1 front triggers tubes GH and GJ, and over d3 front effects the movement of the digit counting train along one step. Following operation of tube GJ relay G operates shorting out by g1 front the inductance I and thereby connecting the loop springs L1 across the outgoing line. Following tube GH relay F operates, preparing the anode and trigger circuits of GK over f4 and f5 front. The tube GK operates after a delay determined by the rate of charge of the condenser C3 between trigger and earth. This delay constitutes the inter-digital pause. Contact f1 front permits relay IG to release and f2 front removes counting pulses from the storage counting chain, f3 front shorting out the loop springs L. The striking of the gas tube GK at the end of the inter-digital pause releases relay F and extinguishes tube GH. Relay IG then operates over f1 back providing the springs M1 are broken, and a train of impulses commences to be transmitted to line.

This impulse train is interrupted so constituting the first transmitted digit when GT50 again becomes operated. This is because relay E is sufficiently fast to operate in the space between two impulses and thereby to initiate the inter-digital pause. The operation of relay F and of the tube GK occurs as before so that the length of the pause is determined, the digit counting chain stepped once and the transmission of the next digit is permitted.

This process is repeated until five digits have been transmitted when gas tube GG will be triggered via e1 front d3 front and d6 front. GG operating will deionise tube GF, thereby releasing relay D which in turn releases relay G by d7 falling back. Over d1 back the control of the storage counting train is transferred again to contact a2. Contact g1 back removes the short circuit across the inductance Id2 opens releasing relay IG and contact ig3 back shorts out the loop springs L1. As has been stated above relay A is released when the connection is completed and such release also allows relay B to drop off.

It will be apparent to those skilled in the art that the provision of such a storage and re-transmission circuit as has just been described could well be made available as common equipment for a number of subscriber's lines. It is also possible to obtain a higher speed of re-transmission which is particularly useful where the number stored is composed of small-valued digits. Consider, for instance the case where the number of 23232. After reception of all the digits the beginning of the first and the completion of each is marked in the counting chain by an operated tube. It may therefore easily be checked that the receipt of the complete number quoted will have set up a pattern in the chain wherein tubes GT1, 3, 6, 8, 11 and 13 are operated. Before any impulses are transmitted to line, GT50 has to operate so that as described the springs M2 have to accomplish thirty-seven interruptions before this may occur. This delay may be avoided by first connecting an impulsing arrangement with a higher repetition rate to the common cathode connection of the chain replacing this arrangement, with a multivibrator circuit as shown in Fig. 4, for instance, when the pattern in its stepping progress towards the GT50 end nears that end. A relay in the anode circuit of e. g. GT48 or 49 which operated when that tube becomes the right-hand operated tube in the pattern is an effective means of changing over from the higher-rate impulsing arrangement to the impulsing springs already described.

As stated above, the re-transmission of a stored number is automatically prepared for and effected as soon as all the digits have been received and the tube GF has therefore been fired. The re-transmission proceedings may be delayed under control of an external circuit, if this is required, simply by inserting an extra "make" contact into the operating circuit of relay IG. The closure of d2 would then operate relay IG only if the control exercised by the external circuit was favourable.

Although a particular application to an automatic telephone exchange of impulse storage and regenerator equipment according to the invention has been described it will be realised that other applications are possible.

While the principles of the invention have been described above in connection with specific examples and particular modifications thereof, it is to be clearly understood that this description is made only by way of example and not as a limitation on the scope of the invention.

What I claim is:

1. An electric circuit for the storage and transmission of information comprising a plurality of interconnected static switches arranged in a chain, one switch for each element of information adapted to be stored and transmitted, means for selectively changing the condition of selected of said switches in accordance with said information, means coupled to the ultimate switch in said chain for transmitting sequentially the information stored in said chain, means for repeatedly, simultaneously altering the condition of all the switches in said chain and means disposed between adjacent of said switches for reinstating to the condition prior to alteration thereof those switches contiguous to said last-named means whose condition was selectively changed by said changing means.

2. An electric circuit as claimed in claim 1 in which the said information is transmitted in the form of teleprinter code signals.

3. An electric circuit as claimed in claim 1 in which each switch is operable over a separate circuit and in which the said separate circuits are each completed over contacts of function or character keys of a teleprinter.

4. An electric circuit as claimed in claim 1 in which the said switches are connected in a chain arrangement wherein a particular condition of a switch may be made to progress along the chain.

5. An electric circuit as claimed in claim 4 in which the said information is received as an impulse train and transmitted in the same form.

6. An electric circuit for the storage and transmission of information as claimed in claim 1, wherein said switches comprise cold cathode glow discharge tubes.

7. Teleprinter code storage and sender equipment comprising a group of interconnected static electrical switches, means for storing a code combination on said switches, one of said switches corresponding to each element of the code, means coupled to said switches for transmitting sequentially the code combination stored in said switches, means for repeatedly, simultaneously altering the condition of all of said switches and means disposed between adjacent of said switches for re-instating to the condition prior to the alteration thereof those switches contiguous to said last-named means whose condition was selectively changed by said changing means.

8. Teleprinter code storage and sender equipment comprising a plurality of interconnected cold cathode glow discharge tubes equal in number to the elements in a code combination and operable to store a code combination, means for selectively causing the discharge of selected of said tubes, such discharges representative of any one actuated character or function, a further tube interconnected with said group of tubes, a sending relay serially connected in the discharge path of said further tube and adapted to operate when said further tube is operated to effect a change-over in the kind of element transmitted, means for repeatedly, simultaneously altering the condition of all of said tubes and means disposed between adjacent of said tubes for re-instating to the condition prior to alteration thereof those tubes of said group contiguous to said last-named means whose condition was selectively changed by said changing means, said altering means comprising a common cathode connection for all of said tubes, a source of impulses connected to said common connection, which impulses effect transmission of the combination by movement of the pattern of operated and non-operated tubes along the interconnected group of tubes one step per impulse received from said source.

9. Teleprinter code storage and sender equipment as claimed in claim 8 comprising an additional tube interconnected with and situated between said group of tubes and said further tube, the said other tube being operable by each key whereby the transmission of a code combination is always preceded by the transmission of one kind of element, termed a "start" element.

ALEXANDER DOUGLAS ODELL.

References Cited in the file of this patent

UNITED STATES PATENTS

| Number | Name | Date |
|---|---|---|
| 2,123,459 | Andersen | July 12, 1938 |
| 2,274,911 | Spencer | Mar. 3, 1942 |
| 2,468,462 | Rea | Apr. 26, 1949 |
| 2,523,300 | Herbst et al. | Sept. 26, 1950 |